United States Patent [19]
Jacobson et al.

[11] Patent Number: 6,073,130
[45] Date of Patent: *Jun. 6, 2000

[54] METHOD FOR IMPROVING THE RESULTS OF A SEARCH IN A STRUCTURED DATABASE

[75] Inventors: Guy Jacobson, Bridgewater; Balachander Krishnamurthy, Chatham; Divesh Srivastava, Summit, all of N.J.

[73] Assignee: AT&T Corp., Middleton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/935,513

[22] Filed: Sep. 23, 1997

[51] Int. Cl.$^7$ ........................................ G06F 17/30
[52] U.S. Cl. ................................ 707/5; 707/3; 707/4
[58] Field of Search ........................... 707/3, 5, 4

[56] References Cited

U.S. PATENT DOCUMENTS

| | | | |
|---|---|---|---|
| 5,321,833 | 6/1994 | Chang et al. | 395/600 |
| 5,675,819 | 10/1997 | Schuetze | 395/760 |
| 5,745,889 | 4/1998 | Burrows | 707/2 |
| 5,745,899 | 4/1998 | Burrows | 707/102 |
| 5,765,149 | 6/1998 | Burrows | 707/5 |
| 5,765,150 | 6/1998 | Burrows | 707/5 |

*Primary Examiner*—Paul R. Lintz
*Assistant Examiner*—Jean Bolte Fleurania
*Attorney, Agent, or Firm*—Kenyon & Kenyon; Michael N. Haynes

[57] ABSTRACT

A method enhances the presentation of search results from a structured database. In accordance with the method, a search query including two or more attribute/value pairs is presented to a system. The system then identifies a plurality of records which each minimally match the search query. Each document or record in the plurality of identified records is assigned a weight based on at least two factors: the extent to which the record matches the entire search query; and the relative frequency with which the attribute/value pair that matches the given record matches the records of the remainder of the structured database. The plurality of records that minimally match the search query are then identified to the requester in ranked order based on the assigned weights.

15 Claims, 3 Drawing Sheets

NAME: JONES
AREA CODE: 202
TELEPHONE NO.: 999-9999
E-MAIL ADDRESS: jj._.com

NAME: JONES
STREET ADDRESS: 1600 PA. AVE.
CITY: WASH  STATE: DC
ZIP CODE: 20011
E-MAIL ADDRESS: bb.com

NAME: JONES
AREA CODE: 202
TELEPHONE NO.: 777-7777
E-MAIL ADDRESS: jj._.com

NAME: JONES
STREET ADDRESS: XX EUCLID ST.
CITY: WASH  STATE: DC
ZIP CODE: 20011
E-MAIL ADDRESS: jj._.com

METHOD FOR IMPROVING THE RESULTS OF A SEARCH IN A STRUCTURED DATABASE

BACKGROUND OF THE INVENTION

The present invention is directed to a method for improving presentation of results of a search in a structured database. More specifically, the present invention is directed to a method for ranking the results of a search in a structured database and presenting the results in ranked order.

It is well known to search for records or documents in a structured database. Such searches typically take the form of specifying one or more attribute/value pairs for some of the attributes of the database schema. Presently it is known to perform such searches on the World Wide Web (WWW). As an example, Rainbow Pages (http://rp.control.att.com/reso.html) can retrieve all of the U.S. residential records matching a given attribute/value pair such as name=J. Doe.

Search engines for structured databases typically use conjunctive strategies for retrieving documents. For instance, if the search query includes two or more attribute/value pairs, then the search engine only returns those documents, or pointers to those documents, which satisfy all of the attribute/value pairs specified in the query. If one of the attribute/value pairs is not found in a given document, then that document is not considered to be a proper response to the query and is disregarded. As a consequence, the results to a search request can be somewhat limited in that the requester will only be provided documents that exactly match the search query.

It is known in the context of searches for unstructured documents on the web to provide a ranked retrieval using a set of key words rather than using the Boolean conditions typically utilized in searches of structured databases. In searches for unstructured documents on the web, given a set of key words k as the query, documents that match any of the key words in k are part of the answer set. As a consequence, the requester can then analyze the retrieved documents and determine which are the most pertinent even where no one of the documents completely satisfies the query.

It would be advantageous if a search of a structured database would provide similarly broad ranges of responses where no one of the documents necessarily matches all of the attribute/value pairs set forth in the search query.

SUMMARY OF THE INVENTION

The present invention provides a method for presenting the results of a search in a structured database. More particularly, the present invention provides a method for ranking the results of a search of a structured database where a search query includes at least two attribute/value pairs. In accordance with an embodiment of the invention, a search engine identifies each record from the structured database that minimally matches the search query. In a more specific embodiment the minimal match requires that the document or record include at least one of the attribute/value pairs in the search query. Having identified a plurality of records that minimally match the search query, each document or record is assigned a weight. The weight may have two components: a first component that is indicative of the extent to which the record matches the entire search query; and a second component that indicates the relative frequency with which an attribute/value pair that matches the record also matches the remaining records in the structured database. The embodiment then presents search results in an order according to the assigned weights.

The method of the present invention avoids the necessity of finding a complete match between a search query and a document and presents search results in a fashion most easily used with the records most likely satisfying the search request being presented first.

BRIEF DESCRIPTION OF THE DRAWINGS

FIGS. 1A to 1E illustrate samples of records which may be searched in accordance with the present invention.

DETAILED DESCRIPTION

Figure 1E:
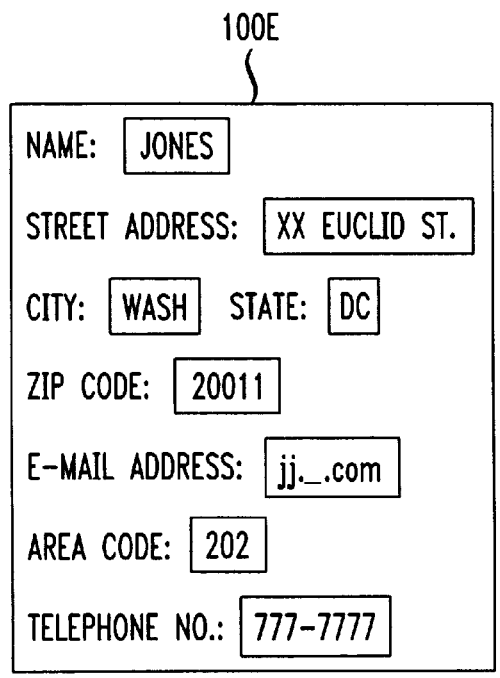

In accordance with an embodiment of the present invention, a search engine identifies all documents or records in a structured database which minimally match a search query that includes two or more attribute/value pairs. In one embodiment a document that minimally matches the search query is one that includes at least one attribute/value pair from a plurality of attribute/value pairs found in the search query. Once all of the documents minimally matching the search query have been identified, the method of the present invention performs a ranking or ordering process.

The ranking process is based on a determination of the semantic difference between a given record and the complete search query. This semantic difference can be determined in a number of different ways. In one embodiment the semantic difference is constituted by two components. The first is a simple determination of the level of matching to the search query that depends on the number of matching attribute/value pairs found in the record as compared to the total number of such pairs in the search query. For instance, if the search query includes five attribute/value pairs and the document matches three such pairs then it would be placed into a matching level with all other documents including three matching attribute/value pairs. In this one embodiment the second component of the semantic difference relates to the relative frequency with which a given attribute/value pair in a document appears throughout the database. A weight is assigned to each document at a certain matching level based on the relative frequency with which the attribute value pairs of that document can be found throughout the database. An example of a weight calculation will be described in more detail in the following. Once the matching levels and weights are assigned to documents then the documents are ranked in order of those with the shortest semantic distance from the search query. That is, those documents which are at the highest level of matching the search query and within a given matching level those documents which have attribute/value pairs that appear less frequently are ranked ahead of those which appear more frequently.

As a consequence of the execution of this ranking procedure the present invention provides enhanced results for searches in a structured database. More details regarding an embodiment of this invention will now be provided.

FIGS. 1A to 1E show samples of documents (also referred to as records) which may be of interest to a person generating a query in or across a structured database. Documents 100A and 100C are of the same basic format with attribute fields identifying a name, area code, telephone number and e-mail address. Documents 100B and 100D also are of similar format having attribute fields of name, street address, city, state, zip code and e-mail address. Finally, document 100E is a more complete document having attribute fields of name, street address, city, state, zip code, e-mail address, area code and telephone number.

Assume for purposes of this example that a user desires to obtain a record providing the street address and e-mail address of a given individual, for example "Jones" known to be at area code 202 and at zip code 20011. The requester could generate a search query that includes three attribute/value pairs, namely, name: Jones, area code: 202, zip code: 20011. If document 100E exists in the database that is searched then the search engine will return document 100E because it satisfies all three attribute/value pairs. Under traditional or known search engines none of the records, FIGS. 1A to 1D, would be returned in response to such a query because each document is missing at least one attribute/value pair. For instance, FIGS. 1A and 1C fail to include the zip code attribute/value pair while FIGS. 1B and 1D fail to include the area code attribute value pair. Thus, if the document 100E of FIG. 1E did not exist, then such a search query as presented above would return no results. In accordance with the present invention, however, which presents records which partially match the search query in a ranked fashion, the requester may still obtain the desired information.

Figure 3:
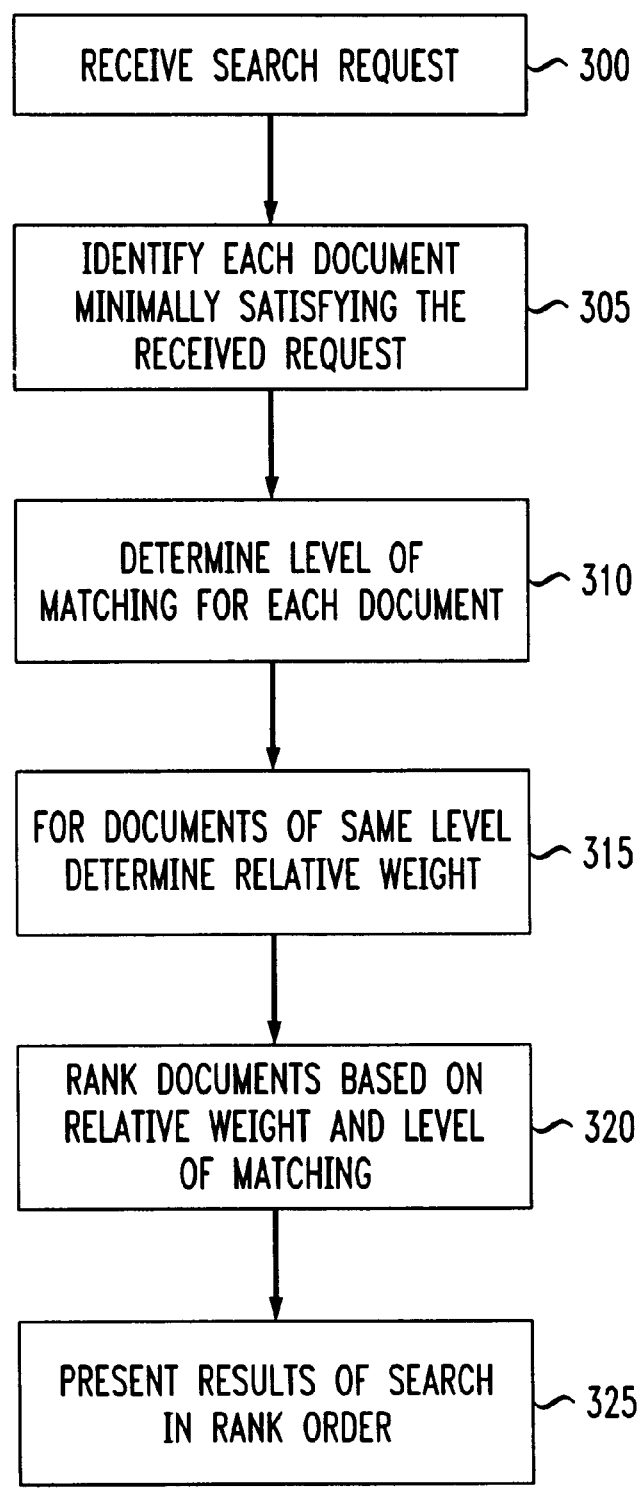
FIG. 3 provides a flow chart illustrating a process flow for implementing a method in accordance with an embodiment of the present invention.

A process flow describing how an embodiment of the present invention may be implemented is set forth in FIG. 3. First, the system receives a search request, step 300. This would correspond in the above example to the trio of attribute/value pairs. Next, the process identifies each document that minimally satisfies the received request. In the present example, we will consider that a document that contains at least one attribute value pair of the plurality of attribute/value pairs defined in the search query minimally matches or minimally satisfies the received request. Of course, the present invention could be modified to require two or more attribute value pairs be found in a given document before it is considered to minimally satisfy the received request. In the case of the present example, all four documents of FIGS. 1A to 1D would be considered to minimally satisfy the search query in that all contain at least two attribute/value pairs of the three set forth in the search query.

Having identified each document that minimally satisfies the received request, the process of the present invention determines the level of matching for each document in step 310. In a more simple determination of such level of matching the present invention determines the number of attribute/value pairs from the search request that are found to be contained in the identified record or document. Thus, for example, where three attribute/value pairs are included in the search query there could be three levels of matching: records that contain a match of all three attribute/value pairs, records that contain matches of any two attribute/value pairs and a third level would be constituted by those documents which match only one of the attribute/value pairs. The level matching could however be even more sophisticated. For example, rather than consider all documents which match any two attribute/value pairs the system could be modified to attribute more significance to particular attribute/value pairs. Thus, in the three attribute/value pairs presented in the example, name, area code and zip code, those records which match a name and a zip code could be considered a higher level of matching than records that match an area code and a zip code, even though in each of these instances at least two of the attribute/value pairs have been matched. For purposes of the example however, we will simply consider all records that have the same number of matching attribute/value pairs to be of the same level.

In accordance with an embodiment of the invention once the level of matching for each document is determined then the documents of the same level are referred to and the process determines the relative weight of each document of the same level, step 315. The relative weight of a given document within a particular level refers to the extent to which the attribute/value pair in the record that matches the search query appears throughout other documents in the structured database. As an example in a database which includes residential information for the entirety of the city of Washington, D.C., there are far more entries that match the attribute/value pair, zip code: 20011, than match the attribute/value pair name: Jones. This determination of the relative frequency of the match in the structured database forms the basis of the assignment of relative weights in step 315. After having determined the level of matching and the relative weight of the documents the present invention ranked the documents based on the relative weight and level of matching, step 320. The results of the search are then presented in rank order, step 325.

In the example shown, since all four documents 100A to 100D each match two attribute/value pairs we will consider them to be at the same level of matching. However, since documents 100A and 100C match the area code 202 which presently applies to the entirety of Washington, D.C., and therefore encompasses all of the zip codes of Washington, D.C., it would presumably appear more frequently as a matching attribute/value pair throughout the structured database than any document which includes the attribute/value pair, zip code: 20011. Therefore, documents 100B and 100D would be attributed a relative weight which causes them to be ranked ahead of documents 100A and 100C.

Of course, those skilled in the art recognize that in presenting the results of the search the search engine could present either the documents themselves or pointers to the documents or identifiers of the documents which would enable the search requester to retrieve copies of the documents. In an implementation involving a search of the World Wide Web, such search results could take the form of a list of URLs for the documents or records which at least partially satisfy the search request, ranked in accordance with the method of the present invention. Continuing with the present example, as documents 100B and 100D are presented to the search requester, based on the present search query the documents may have similar weight and so the presentation of the documents to the user as could be done on an arbitrary basis. However, once presented the search requester could select the document of higher interest based on the remaining attribute/value pairs which appear in the record. Thus, the requester would be able to select which of the two records 100B or 100D would be of most interest. Alternatively, the user may not be interested in either of these two documents even though they were ranked higher in the order of presentation. The user would then still be able to observe the content of records 100A and/or 100C since the search engine retrieved these documents as well even though they too were incomplete matches to the search query.

A more detailed routine for ranking the records in an answer set while taking advantage of the database structure will now be described.

Given a query on a structured database specified by a set of attribute/value pairs AV, the rank retrieval approach would return those records that match any of the attribute/value pairs in AV with the semantic distance of the record to the attribute/value pairs in AV forming the basis for ordering the records in the answer set. For example, let $A_1, \ldots A_n$ be the attributes in the structured database with domains $D_1, \ldots D_n$ respectively, that is the values in attribute $A_i$ are from domain $D_1$. Given a particular database, let $f_{ij}$ be the fraction of the total number of records in which value $v_j$ occurs in attribute $A_i$. Consider a query specified by a set of attribute/value pairs AV and let R be the set of all records in the database that match at least one of the attribute/value pairs in AV. Each record r which is an element of R is assigned a numerical weight, w(r) as follows:

--- for each record r which is an element of R
w (r) = 0;
for each attribute/value pair {$A_i = v_j$} in query AV
   if the value of attribute $A_i$ of record r is $v_j$
      w (r) + = − log $f_{ij}$
   and if
   end for
end for

---

Each record r which is an element of R ends up with a non-negative weight and records are ranked in order of decreasing weight, that is records with a higher weight are presented before records with lower weight. It should be noted that -log $f_{ij}$ is just one choice for a weighting function.

Figure 2:
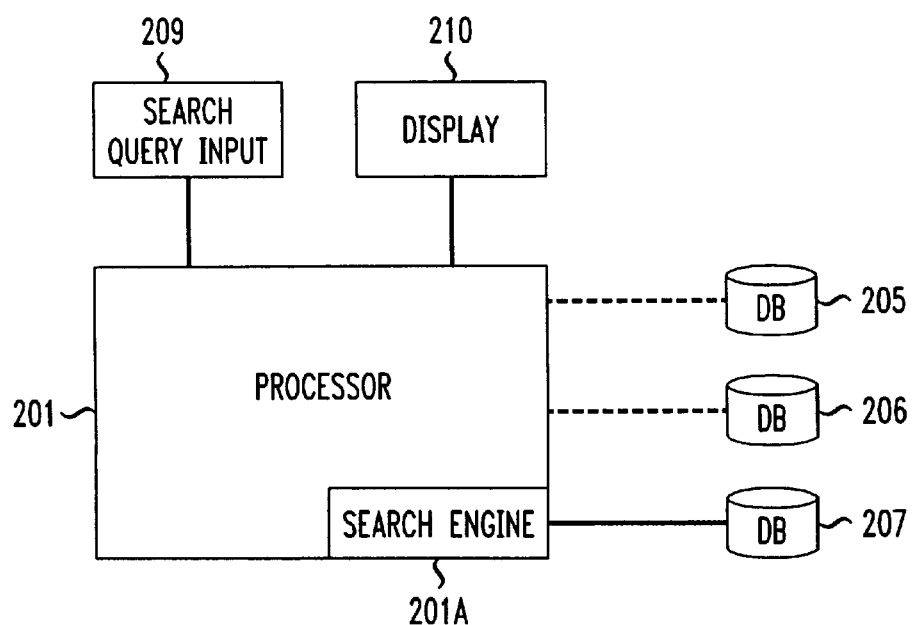
FIG. 2 illustrates an embodiment of a system for conducting a search in accordance with an embodiment of the present invention.

A block diagram of a system in which the present invention could be incorporated is illustrated in FIG. 2. In one embodiment, a processor 201 includes a search engine 201a. The processor can be coupled or connected to a display 210 and search query input device 209. Furthermore, the processor can be coupled to one or more databases 205 to 207. Each database is presumed to store a plurality of records or documents. The processor and the search engine can operate to search either one database or a plurality of databases in response to a given search query. Furthermore, the coupling to the databases could be by means of a network such as a packet switched network like the one commonly referred to as the Internet. In such a circumstance the processor could constitute a node of the network and the display device 210 could be coupled to the processor via the same network or another network. The display could then be incorporated with processing capabilities for generating a search query for transmission to the processor. A typical device which would incorporate such a display would be a personal computer. The computer could be running a browser such as Microsoft's Internet Explorer or Netscape's Navigator.

The present invention provides an improved searching scheme for finding relevant documents or records in a structured database and presenting them in a more useful way to the search requester.

What is claimed is:

1. A method for ranking the results of a search of a structured database where a search query includes at least two attribute/value pairs and no explicit OR statements, the method comprising the steps of:

identifying a plurality of records constituting a subset of said structured database where each record in the subset matches less than all of the attribute/value pairs of the search query;

after said step of identifying, assigning a weight to each record in the subset, said weight being indicative of the extent to which the record matches the entire search query and the relative frequency with which an attribute/value pair that matches the record matches the records of the structured database; and presenting search results in an order according to said assigned weights.

2. The method of claim 1 wherein in said order, records more closely matching said query are presented before records less closely matching said query.

3. The method of claim 1 wherein each document in the identified plurality of records matches at least one of the attribute/value pairs of the search query.

4. A method of presenting results of a search of a structured database containing a plurality of records, the method comprising the steps of:

receiving a search query identifying at least two attribute/value pairs, the search query containing no explicit OR statements;

comparing the search query to the records in said database;

identifying each record in said database matching at least one and less than all of said attribute/value pairs;

after said step of identifying, for each record identified in said step of identifying, assigning a ranking; and presenting each record identified in said step of identifying in an order corresponding to the ranking assigned to each record.

5. The method of claim 4 wherein any document matching all of said attribute/value pairs in said search query has a higher ranking than all records matching less than all of said attribute/value pairs in said query.

6. The method of claim 4 wherein among records identified in said step of identifying and matching fewer than all of said attribute/value pairs, identifying a group of records that each match the same number of attribute/value pairs and within said identified group ranking a given document in accordance with a relative frequency within the database for an attribute/value pair matching the given document.

7. The method of claim 4 wherein said search query includes two attribute/value pairs and said step of assigning rankings provides a first ranking to a document matching both attribute/value pairs, provides a second ranking, lower than said first ranking to a document matching only a first one of the two attribute value pairs, and provides a third ranking lower than said second ranking to a document matching only a second one of the two attribute/value pairs, and wherein said first one of the two attribute/value pairs matches fewer records in said database than said second one of the two attribute value pairs.

8. The method of claim 4 wherein said search query includes n attribute/value pairs where n is an integer and n≧2, and further steps include:

identifying a first group of records, which each match at least m attribute/value pairs in said search query where 1≦m<n;

identifying a plurality of combinations of m attribute/value pairs associated with said first group;

determining a matching frequency for each combination of said plurality of combinations of m attribute/value pairs; and ranking each given document in said first group in accordance with a matching frequency for that combination of m attribute/value pairs that matches said given document.

9. A method of presenting results of a search of a structured database containing a plurality of records, the method comprising the steps of:

receiving a search query identifying at least two attribute/value pairs, the search query containing no explicit OR statements;

comparing the search query to the records in said database;

identifying each record in said database matching at least one and less than all of said attribute/value pairs;

after said step of identifying, for each record identified in said step of identifying, assigning a ranking; and presenting a list of pointers to each record identified in said step of identifying wherein the order of pointers on said list corresponds to the record ranking assigned to the records corresponding to the pointers.

10. The method of claim 9 wherein any document matching all of said attribute/value pairs in said search query has a higher ranking than all records matching less than all of said attribute/value pairs in said query.

11. The method of claim 9 wherein among records identified in said step of identifying and matching fewer than all of said attribute/value pairs, identifying a group of records that each match the same number of attribute/value pairs and within said identified group ranking a given record in accordance with a relative frequency within the database for an attribute/value pair matching the given document.

12. The method of claim 9 wherein said search query includes two attribute/value pairs and said step of assigning rankings provides a first ranking to a document matching both attribute/value pairs, provides a second ranking, lower than said first ranking to a document matching only a first one of the two attribute value pairs, and provides a third ranking lower than said second ranking to a document matching only a second one of the two attribute/value pairs, and wherein said first one of the two attribute/value pairs matches fewer records in said database than said second one of the two attribute value pairs.

13. The method of claim 9 wherein said search query includes n attribute/value pairs where n is an integer and n≧2, and further steps include:

identifying a first group of records, which each match at least m attribute/value pairs in said search query where 1≦m<n;

identifying a plurality of combinations of m attribute/value pairs associated with said first group;

determining a matching frequency for each combination of said plurality of combinations of m attribute/value pairs; and ranking each given record in said first group in accordance with a matching frequency for that combination of m attribute/value pairs that matches said given record.

14. A method for obtaining selected records from a structured database, the method comprising the steps of:

receiving a search query including a plurality of attribute/value pairs, the search query containing no explicit OR statements;

comparing said search query to records in the structured database;

for each attribute/value pair in the query; storing an indication of the records that match that attribute/value pair;

identifying any record that matches every attribute/value pair in said search query and for any such identified record assigning a highest priority ranking;

identifying each record matching at least one of the attribute/value pairs in the query, but less than all of the attribute/value pairs in the query; and after said step of identifying each record, automatically assigning ranking based on a semantic distance of the record from the entire search query.

15. The method of claim 14 wherein said semantic distance includes the number of attribute/value pairs matching the document and the relative frequency with which one of the matching attribute/value pairs matches other records in the structured database.

* * * * *